United States Patent [19]

Lacy, Jr.

[11] Patent Number: 4,479,929
[45] Date of Patent: Oct. 30, 1984

[54] PRODUCTION OF SULFUR FROM A $H_2S$-BEARING GAS STREAM

[75] Inventor: F. Hilton Lacy, Jr., Houston, Tex.

[73] Assignee: Mineral & Chemical Resource Co., Houston, Tex.

[21] Appl. No.: 448,200

[22] Filed: Dec. 9, 1982

Related U.S. Application Data

[63] Continuation-in-part of Ser. No. 385,779, Jun. 7, 1982, abandoned.

[51] Int. Cl.³ .............................................. C01B 17/05
[52] U.S. Cl. .................................... 423/575; 423/222; 423/223; 423/243
[58] Field of Search ............ 423/222, 223, 243, 574 R, 423/574 L, 574 G, 575

[56] References Cited

U.S. PATENT DOCUMENTS

| | | | |
|---|---|---|---|
| 2,881,047 | 4/1959 | Townsend | 423/575 |
| 3,793,440 | 2/1974 | Schulze | 423/575 |
| 4,107,269 | 8/1978 | Russarle et al. | 423/222 |

FOREIGN PATENT DOCUMENTS 1492013  7/1967  France ............................... 423/575

Primary Examiner—Earl C. Thomas
Assistant Examiner—Jeffrey E. Russel
Attorney, Agent, or Firm—Larry B. Phillips, III; Lee R. Larkin

[57] ABSTRACT

A process for reacting the $H_2S$ in $H_2S$-bearing gas streams with $SO_2$ in a solvent to produce elemental sulfur, including the steps of oxidizing approximately ⅓ of the $H_2S$ in the stream to $SO_2$, absorbing that $SO_2$ with a dialkyl alkyl phosphonate absorbent and reacting that $SO_2$ with the remaining $H_2S$ from the stream in the presence of the phosphonate solvent, thereby forming elemental sulfur and water.

9 Claims, 8 Drawing Figures

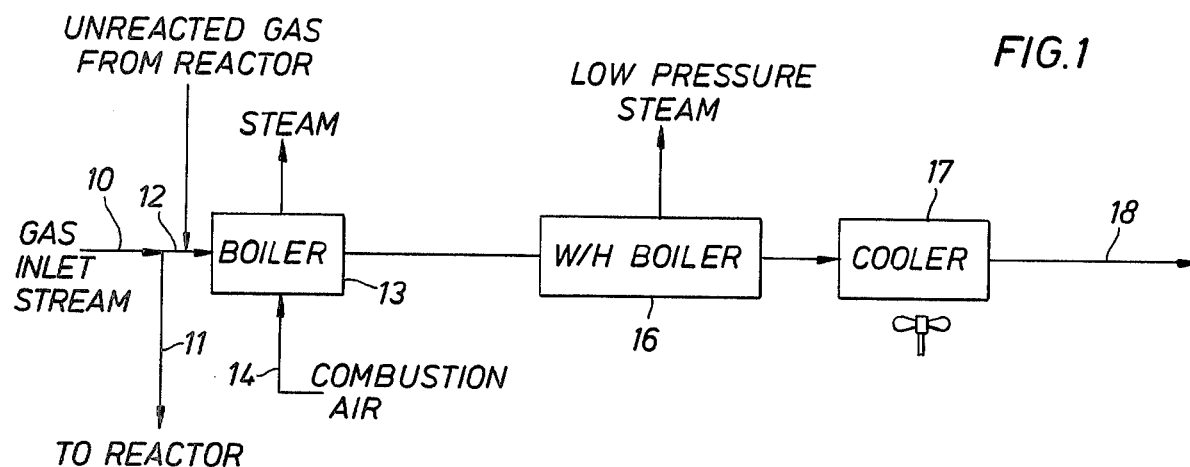
FIG.1
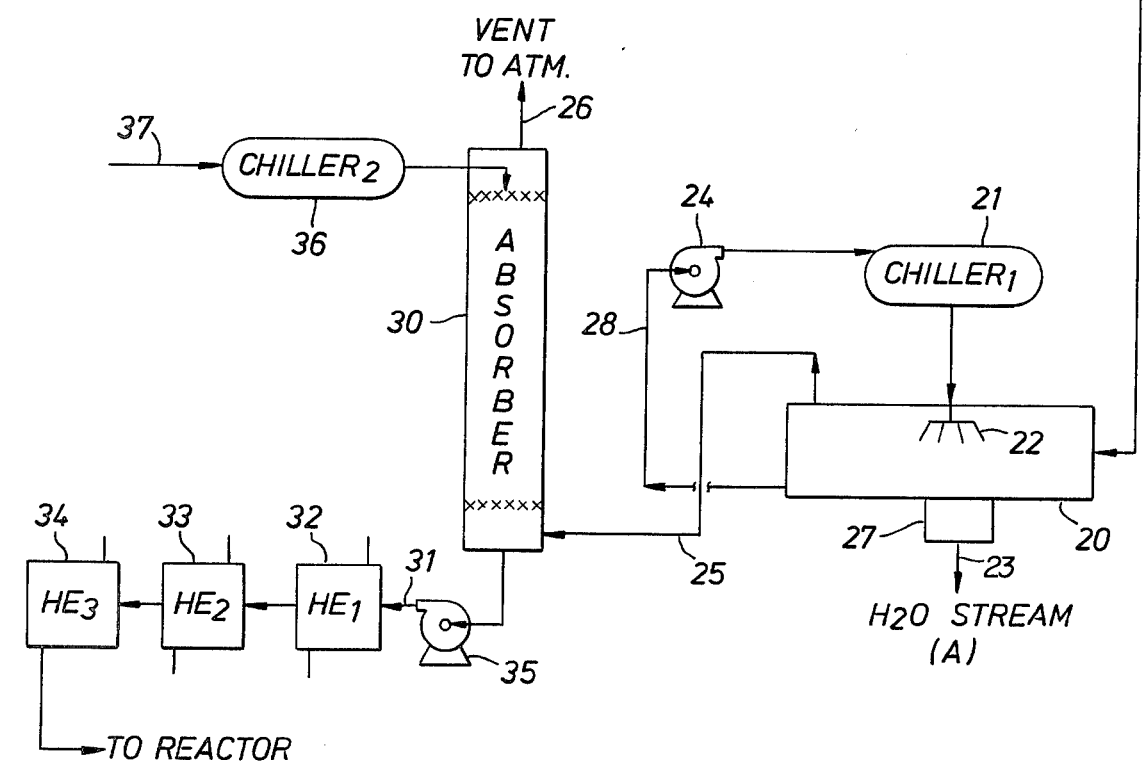
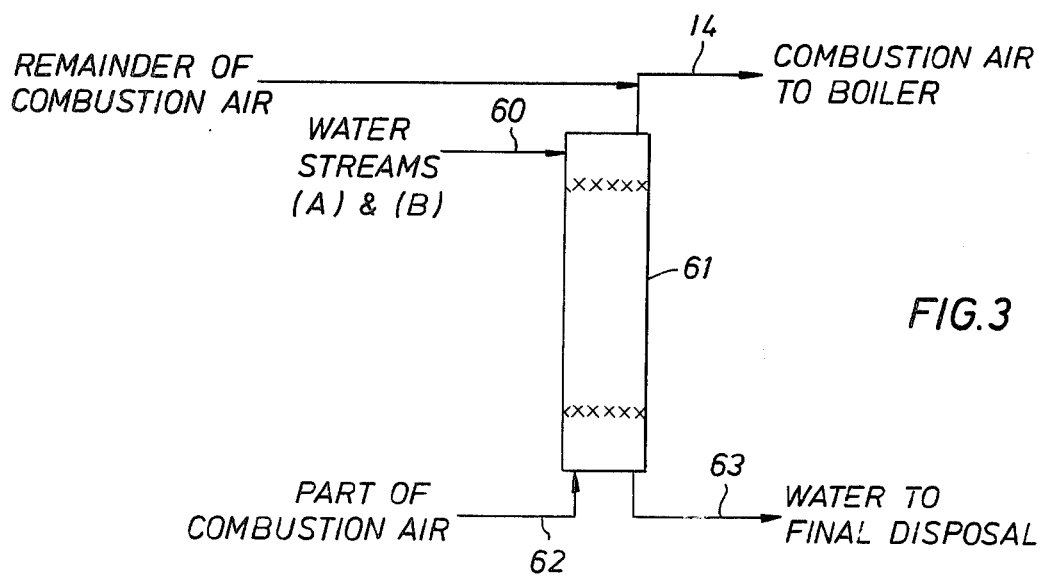
FIG.3

PRODUCTION OF SULFUR FROM A H₂S-BEARING GAS STREAM

CROSS REFERENCE TO RELATED APPLICATION

This application is a continuation-in-part of the copending application by the same inventor and applicant herein, Ser. No. 06/385,779, filed June 7, 1982, now abandoned, and entitled "Production of Sulfur from an H₂S Bearing Gas Stream."

BACKGROUND OF THE INVENTION

A. Field of the Invention

This invention relates to the production of elemental sulfur from an H₂S-bearing gas stream.

B. Prior Art Background

The problems attendant to removal of H₂S, and SO₂ and other sulfur-bearing gases from various gas streams has been long known and researched. Many of such processes are thoroughly discussed in a number of publications, including "Gas and Liquid Sweetening," Maddox, Second Edition, April 1977. There are several H₂S removal processes which result in relatively rich H₂S gas streams even when other conditions make the production of a rich H₂S stream difficult (e.g., large quantities of CO₂ relative to H₂S in the original gas stream). An example of such a process is that discussed in U.S. Pat. No.3,989,811 issued Nov. 2, 1976. Most of such processes, however, remove much of the CO₂ along with the H₂S and do not result in a highly concentrated H₂S stream.

Relatively rich H₂S-bearing streams have most commonly been converted to sulfur using the so-called Claus process. In the Claus process, the objective is to combust exactly one-third of the H₂S to SO₂ and then react the two gases in the vapor phase in the presence of a suitable catalyst according to the following reaction:

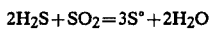

$$2H_2S + SO_2 = 3S^\circ + 2H_2O$$

Controlling the air required to combust exactly one-third of the H₂S is extremely difficult, particularly when any quantities of hydrocarbons are present. In addition, since sulfur and water vapor are not removed from the reacting stream, the reaction does not proceed to completion. The equipment for a Claus plant is large and expensive, and conversion to sulfur is typically only 93% to 97%. Ultimate conversion almost never reaches 99%, even when using 4 or more catalytic reactors in series. Even at 99% conversion, in excess of 3000 parts per million of SO₂ would be emitted to the atmosphere without a tail gas treating unit, many of which are known to those skilled in the art, and which are also expensive installations.

Very lean (10% or less) H₂S bearing gas streams are not easily handled by any sulfur conversion process, particularly the Claus process, because flame stability in the combustion of H₂S to SO₂ is difficult or impossible to sustain at such low levels of H₂S.

There have been a number of processes proposed in which the H₂S-SO₂ reaction is not carried out in the vapor phase as in the Claus process, but in a solvent, either organic or aqueous. An example of such a process utilizing an organic solvent is disclosed in U.S. Pat. No. 3,598,529. In many of such organic solvent processes, the vapor pressure of the solvent is sufficiently high that the contaminating gases, predominately N₂ and CO₂, carry off such an amount of solvent that the process is not economic. In addition, various studies have reportedly demonstrated that direct absorption by organic solvents leads to reaction with H₂S or SO₂ to form complexes which can only be broken by tearing the solvent apart.

Aqueous medium absorption of SO₂ and reaction with H₂S in that aqueous medium contribute to the formation of sulfates, thiosulfates and thionates. The formation of these "heat stable salts" leads to fouling of the absorbent and expensive processes must be utilized to rid the absorbent of them. Disposal of the heat stable salts in an ecologically satisfactory manner presents yet another difficultly with aqueous systems.

SUMMARY OF THE INVENTION

The invention includes combusting the H₂S of approximately one-third of an inlet stream containing H₂S to SO₂. The SO₂ thus created is absorbed by contacting the SO₂ bearing stream with a phosphonate solvent-absorbent. The remainder of the H₂S-bearing inlet stream is then reacted with the absorbed SO₂ in the presence of the phosphonate solvent-absorbent. Elemental sulfur and water are formed. If the reaction is carried out at elevated temperatures, the sulfur is dissolved in the phosphonate solvent-absorbent, and water vapor removed from the reaction site by the components of the gas stream from the reactor. If the reaction is carried out at ambient temperatures, the sulfur formed crystallizes and the solid sulfur, water and phosphonate absorbent are separated. The remaining unreacted gases are recycled to the combusting step in both embodiments.

BRIEF DESCRIPTION OF THE DRAWINGS

FIG. 1 is a partial schematic of the elevated temperature embodiment of the process, showing the combustion of a portion of the inlet stream of H₂S to SO₂, the absorption step of the SO₂ thus converted, and heat added to the SO₂-enriched absorbent.

FIG. 3 is a schematic representation of the treatment of water streams A and B from FIGS. 1 and 2 to remove some of the dissolved gases from that water before final water disposal.

DESCRIPTION OF THE PREFERRED EMBODIMENT

Figure 2:
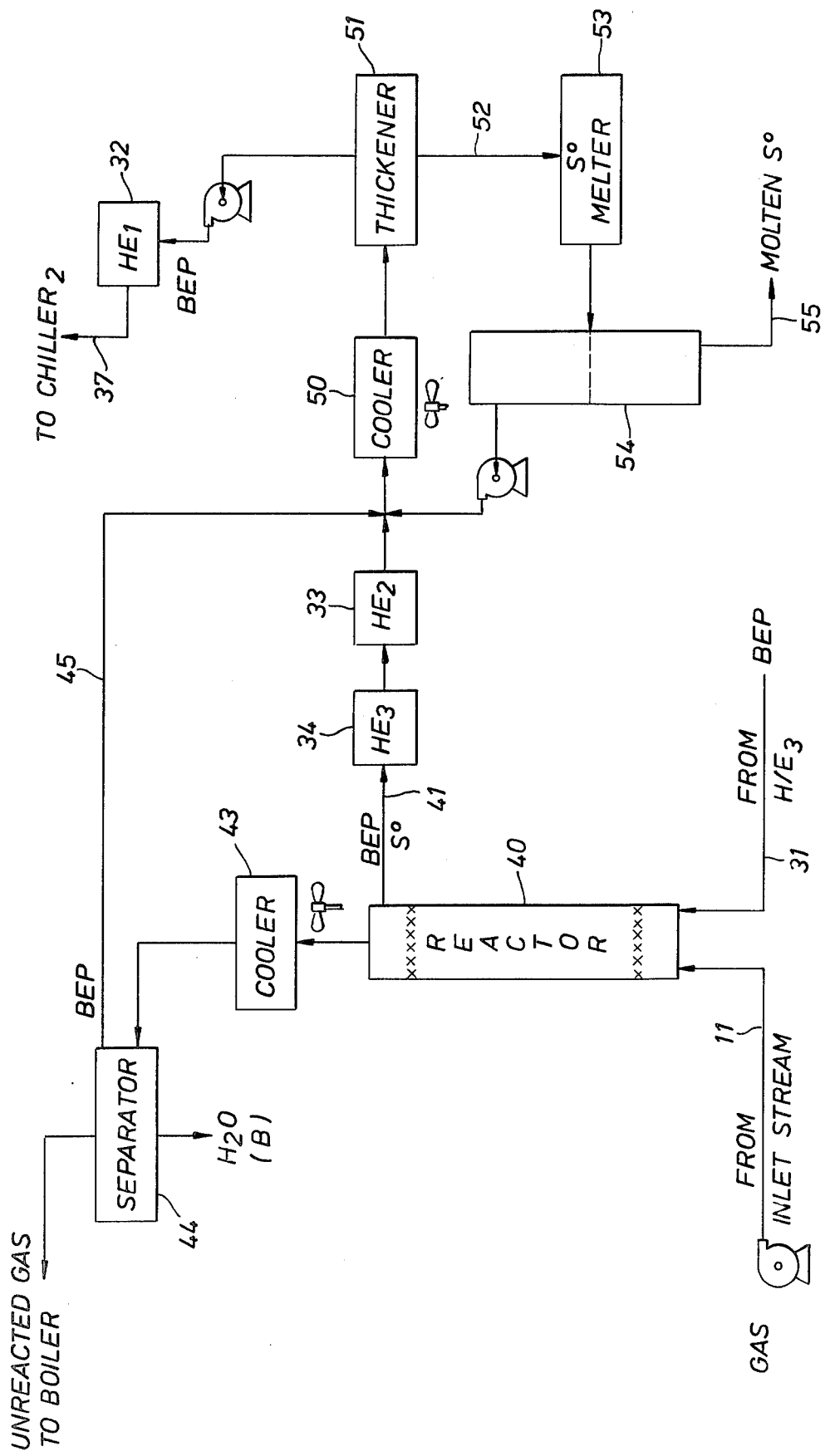
FIG. 2 is a partial schematic of the process, showing the H₂S-SO₂ reaction step at elevated temperature and removal of the product sulfur.
Figure 4:
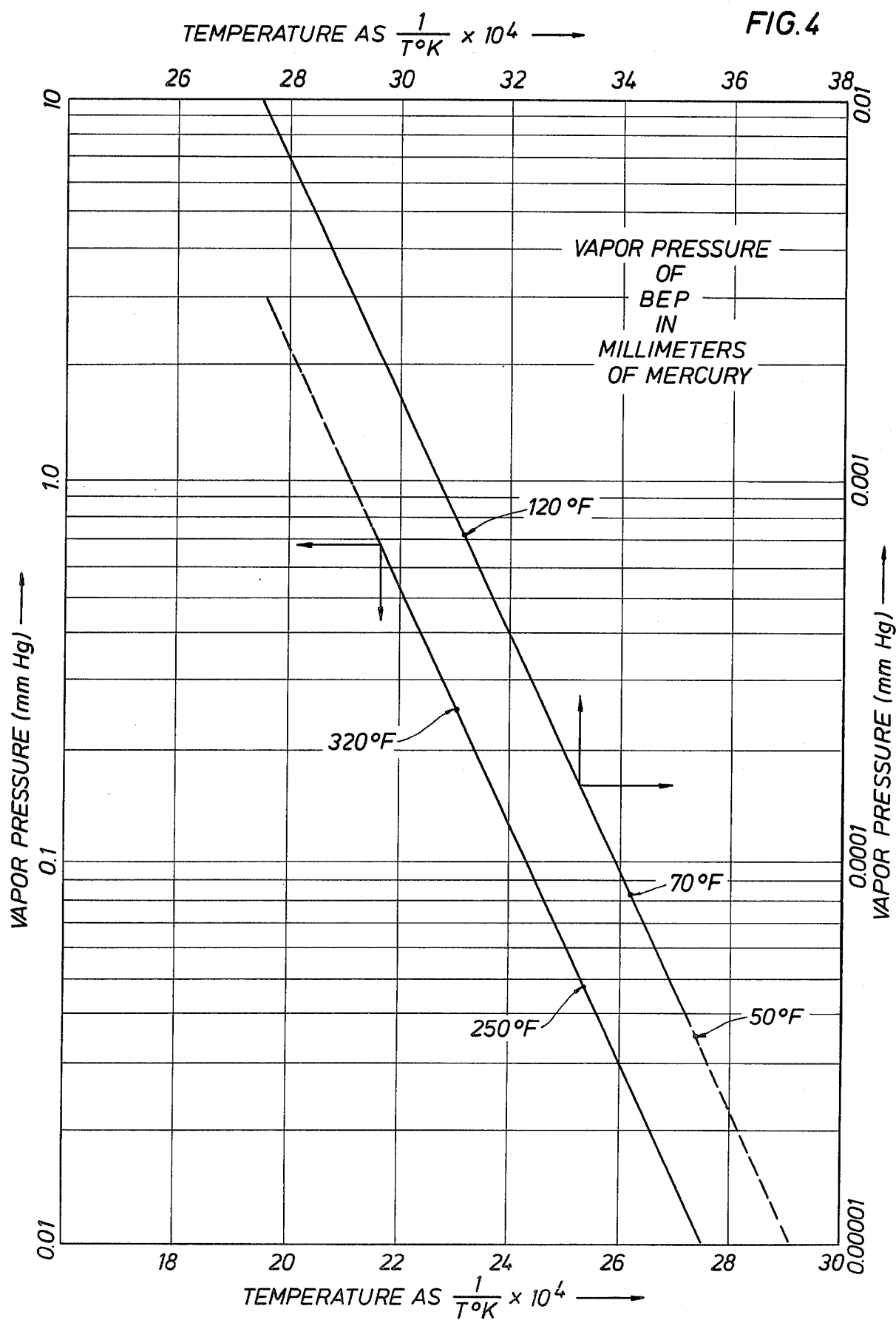
FIG. 4 is a graphical representation of the vapor pressure of Bis (2-ethylhexyl) 2-ethylhexyl phosphonate (BEP) in millimeters of mercury versus temperature in degrees Fahrenheit.

The phosphonate absorbent and reaction medium which has been found most efficacious in this invention is Bis (2-ethylhexyl) 2-ethylhexyl phosphonate (herein "BEP"). Another dialkyl alkyl phosphonate which can be used in the invention is dibutyl butyl phosphonate. Both of these dialkyl alkyl phosphonates are neutral esters of phosphonic acid and are clear, colorless, mobile liquids with very mild odors. When the terms "phosphonate absorbent", "phosphonate solvent-absorbent" or "reaction medium" are used herein, they refer to the family of dialkyl alkyl phosphonates useful in this invention and includes the two specific ones mentioned above and homologues of them which have lower vapor pressure, greater ability to absorb $SO_2$, or both characteristics.

The preferred dialkyl alkyl phosphonate, BEP, has a molecular weight of 418.6, a boiling point of 320° F. at 0.25 millimeters of Hg. absolute pressure. It has a Cleveland open cup flash point of 420° F. and a specific gravity of 0.908. Its viscosity is 8.84 centistokes at 100° F. and 2.37 centistokes at 210° F. It is immiscible with and essentially completely insoluble in water and has very low toxicity.

The process of the invention utilizes BEP's high solubility of $SO_2$ at or near ambient temperatures and its substantially hydrophobic nature aid in the absorption of $SO_2$ and the reaction of $H_2S$ and $SO_2$ in its presence to produce sulfur. In the embodiment in which $H_2S$ and $SO_2$ are reacted in the presence of BEP at elevated temperatures, the high solubility of sulfur in BEP at those temperatures also assists completeness of the $H_2S$-$SO_2$ reaction. Those characteristics, together with the low solubility of sulfur in BEP at lower temperatures, provide an excellent medium for producing sulfur from $H_2S$ bearing gases originating from various sources such as "sour" natural gas or refinery off-gases. Although it is believed that BEP operates best in the process in its undiluted state, one might add extenders or inert ingredients to yield an absorbent consisting essentially of BEP in the contacting and reacting steps described below without changing the essential benefits obtained.

By way of brief summary, both embodiments of the process treat an inlet feed stream gas containing about 1 to 100% hydrogen sulfide of which stream approximately one-third is oxidized to convert the $H_2S$ and other sulfur-bearing gases such as COS or $CS_2$ to $SO_2$. Hydrocarbons may be burned to maintain flame stability in the oxidizer, or boiler, if required, and a slight excess of air to insure complete oxidation is preferred. The converted stream is then cooled or chilled and water is removed therefrom. This embodiment utilizes a packed column to absorb sulfur dioxide countercurrently with an absorbent-solvent consisting essentially of BEP at a temperature preferably between 35° F. and 70° F. The remaining unabsorbed gases containing $CO_2$, $N_2$ and the like, along with very small amounts of unabsorbed $SO_2$ as low as 250 ppm or lower, are vented to the atmosphere. This result is obtained without the use of a tail gas unit.

In the elevated temperature embodiment, the BEP containing the absorbed $SO_2$ is then heated and taken to a packed column reactor and contacted at a liquid inlet temperature of between 175° and 225° F. and an outlet temperature of between 225° and 275° F. cocurrently with the $H_2S$-containing gases which represent the remaining approximately two-thirds of the inlet stream. In the reactor, the $H_2S$ and $SO_2$ react in the presence of BEP to form elemental sulfur and water. The reaction proceeds to 85% to 95% completion, the unreacted gases are recirculated to the oxidizer, and the hot BEP containing the dissolved produced sulfur is then cooled, causing the sulfur to crystalize and separate from the BEP. The separated sulfur preferably is then melted and any BEP which adhered to the solid sulfur is decanted and returned to process. The BEP after separation of the solid sulfur is then further cooled or chilled and recirculated to the absorber.

Reference is now made to the drawings, with which this embodiment of the process will now be described in detail.

Referring now to FIG. 1, an inlet stream (10) containing $H_2S$-bearing gases is divided into the reactor feed stream (11) and the boiler feed stream (12). Boiler feed stream (12) represents approximately ⅓ and reactor feed stream (11) represents about ⅔ of inlet stream (10). Boiler feed stream (12) also includes that portion of the gases from the reactor (40) on FIG. 2 which emerge from reactor (40) unreacted. Taking now boiler feed stream (12), that stream is fed into the boiler (13) and is oxidized with the combustion air stream (14). The $H_2S$ contained in boiler feed stream (12) is oxidized to $SO_2$, as are other sulfur-bearing gases such as COS and $CS_2$. Hydrocarbons which may be present in that stream are oxidized as well. A slight stoichiometric excess of combustion air (14) is maintained to assure complete oxidation.

The products of the boiler combustion proceed through the waste heat boiler (16) and the cooler (17) to cool the $SO_2$-containing gas in the line (18) to an absorber gas chiller (20). In absorber gas chiller (20) chilled BEP from the BEP chiller (21) is sprayed from the contactor sprayer (22) in absorber-gas chiller (20) to contact the oxidized inlet stream gases from line (18). The gases exiting boiler (13) were cooled from in excess of 500° F. to about 120° F. in line (18) by waste heat boiler (16) and air cooler (17). The BEP from BEP chiller (21) is at about 35°–40° F. and when the gases from line (18) are cooled further by contact with the chilled BEP, water condenses therefrom, falls to a lower portion (27) of absorber gas chiller (20) and is removed by way of the water removal line (23). The BEP from near the bottom of contactor (20) is recycled through the chiller line (28) and the spray pump (24) and is cooled again in BEP chiller (21). Any BEP that becomes entrained in the chilled gas stream in absorber gas chiller (20) is carried over to the absorber (30). The BEP in the chiller circuit reaches equilibrium with respect to $SO_2$ absorbed, and after equilibrium is reached, that BEP takes no part in the absorption step of the process.

Figure 6:
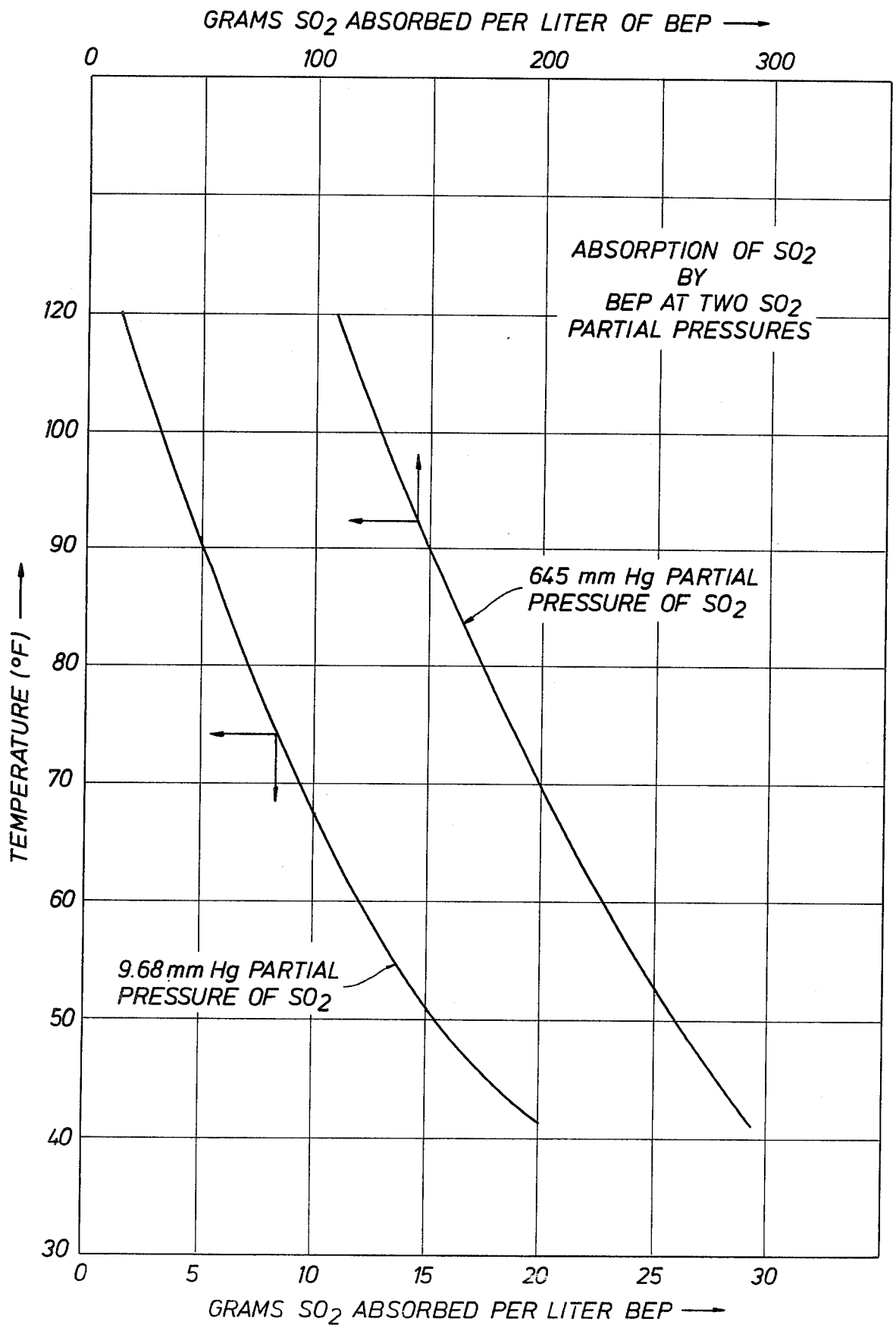
FIG. 6 is a graphical representation of the absorption in grams of SO₂ absorbed per liter of BEP at 9.68 millimeters of mercury partial pressure of SO₂ and at 645 millimeters of mercury partial pressure of SO₂ at varying temperatures in degrees Fahrenheit.

Chilled gas containing $SO_2$ from which water has been removed is then transferred by absorber feed line (25) to a lower portion of absorber (30). Absorber (30) is a packed column in which $SO_2$ containing gases are contacted countercurrently with chilled BEP at between 35° F. and 70° F. While temperatures may vary, it may be seen from FIG. 6 that $SO_2$ absorption is distinctly increased at lower temperatures. The treated gas stream, now reduced to acceptable environmental levels of $SO_2$, is exhausted to the atmosphere through the vent line (26) in an upper portion of absorber (30). The gases exiting vent line (36) are principally $CO_2$ and nitrogen, since the BEP in absorber (30) has preferentially absorbed only $SO_2$ from the products of boiler combustion.

The BEP containing absorbed $SO_2$ flows out of a lower portion of absorber (30) through the absorber exit line (31), absorber pump (35), and in this elevated temperature embodiment, through the absorber heat exchangers (32), (33), and (34) and to the reactor (40) shown in FIG. 2. Heat has been added to the BEP in heat exchangers (32), (33) and (34) to increase the temperature of the $SO_2$-laden BEP from about 45° F. to about 175° F.

Figure 5:
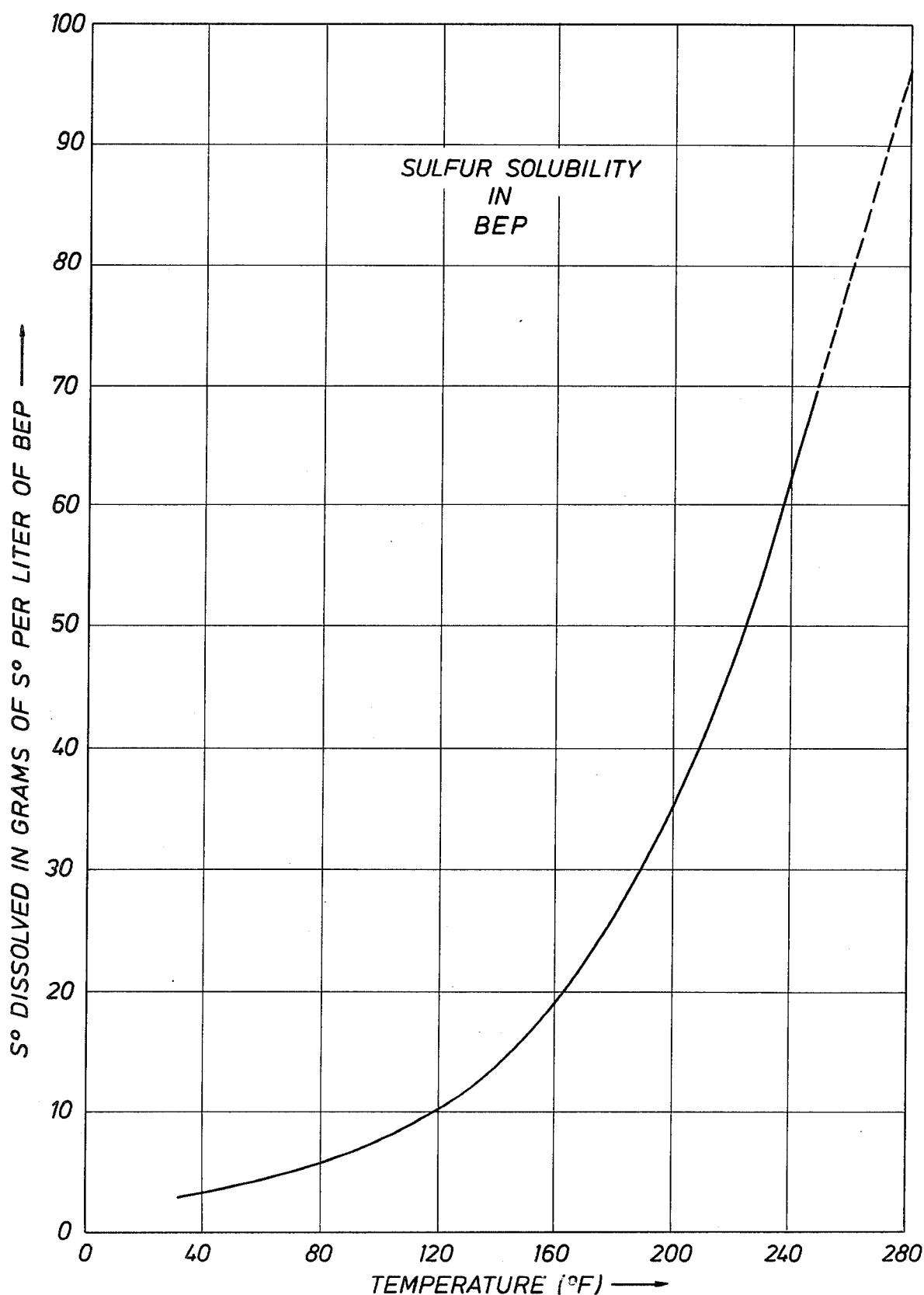
FIG. 5 is a graphical representation of sulfur solubility in BEP in grams of sulfur per liter of BEP versus temperature in degrees Fahrenheit.

Referring now to FIG. 2, the remainder of inlet gas to the process in reactor feed stream (11) is fed into reactor (40) to contact the $SO_2$-laden BEP from absorber exit line (31). As the feed stream containing $H_2S$ and the BEP containing $SO_2$ flow in the same direction up the packed column of reactor (40), the $H_2S$ and $SO_2$ react in the presence of the BEP and sulfur and water are formed. The temperature at the outlet of reactor (40) is ideally between 225° F. and 275° F. Reference is made to FIG. 5 which shows the solubility of elemental sulfur in BEP. At the temperatures in reactor (40), product sulfur is dissolved in the BEP, and is carried away from the top of reactor (40) by the product line (41) through the cooling side of absorber heat exchangers (34) and (33). The sulfur-laden BEP passes through the sulfur cooler (50) and to the thickener (51). At this point, most of the dissolved sulfur has solidified. The BEP is then separated from the solid sulfur in thickener (51) and cooled in the absorber heat exchanger (32) for return to the absorber chiller (36). Further separation of solid sulfur and BEP could be achieved by filtration or centrifugation at this stage if desired. The BEP in the absorber line (37) is then passed through absorber (30) again to absorb more $SO_2$.

The precipitated sulfur from thickener (51) still contains some BEP therein. The mixture is transferred by the melter line (52) to the melter (53) in which the temperature is elevated sufficiently to melt the sulfur. Although the solubility of sulfur increases with increasing temperature, the lesser amount of BEP present in melter (53) in relation to the amount of molten sulfur creates a liquid-liquid interface when transferred to the sulfur separator (54). The lower liquid phase, molten sulfur, is substantially immiscible with the upper liquid phase, sulfur-saturated BEP, in sulfur separator (54). The substantially pure molten sulfur is drained from sulfur separator (54) by the sulfur exit line (55) to product storage (not shown).

The unreacted $SO_2$, $H_2S$, water vapor and other gases which exit reactor (40) from the reactor off-gas line are passed through the reactor cooler (43). Water which condenses in reactor cooler (43) is separated from the gas stream in the reactor separator (44). The remaining unreacted gases from reactor separator (44) are then piped to boiler feed stream (12) to be burned in boiler (13) and recycled through the absorption and reaction steps. Also, any condensed BEP, evaporator or entrained in the reactor off-gases is separated in reactor separator (44) and flowed through the BEP line (45) to join product line (41) prior to sulfur cooler (50). The decanted BEP from sulfur separator (54) also is recycled to sulfur cooler (50), thickener (51) and melter (53).

Referring now to FIG. 3, an intermediate step to partially remove the $SO_2$ from the water from reactor separator (44) in FIG. 2 and absorber gas chiller (20) in FIG. 1 is shown. The water stream (60), which is a composite of the two aforementioned water streams, is fed to an upper portion of the packed column of the water stripping tower (61). Countercurrent to water stream (60) a portion of combustion air stream (14) is circulated therethrough from the air line (62). The air in air line (62) strips dissolved gases such as $SO_2$ from the water in water stream (60), is passed to combustion air stream (14), and the partially stripped water is passed to final disposal through the waste water line (63).

Figure 7:
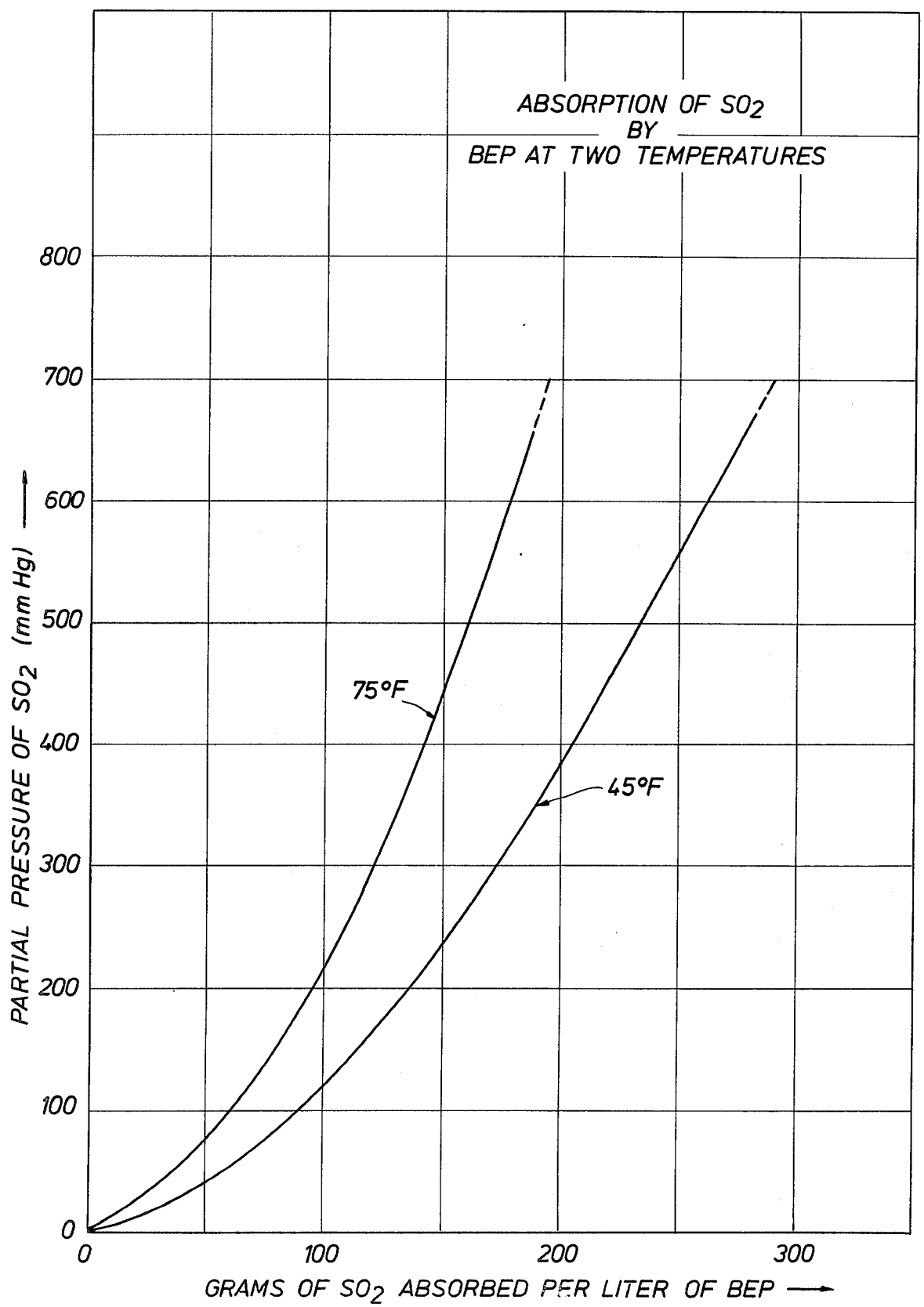
FIG. 7 is a graphical representation of the absorption of SO₂ by BEP at 45 degrees Fahrenheit and 75 degrees Fahrenheit, showing grams of SO₂ absorbed per liter of BEP at varying partial pressures of SO₂.

Referring to FIG. 7, the absorption of $SO_2$ in BEP is shown to increase with increasing partial pressure. The preferred pressure in absorber (30) is from about 0 pounds per square inch gauge (p.s.i.g.) to about 25 p.s.i.g. Pressure increases the amount of $SO_2$ which BEP can absorb, but the absorption or contacting step can be carried out at relatively low pressure resulting in less expensive equipment for the process.

The pressure in reactor (40) can be relatively low and still allow the $SO_2$ and $H_2S$ to react. The preferred reactor pressure is in the range of 12 to 25 p.s.i.g. Since the $H_2S$-$SO_2$ reaction is exothermic, the $SO_2$-laden BEP entering reactor (40) is preferably in the 175° F.–225° F. range. With the heat of reaction, this inlet BEP temperature normally yields an outlet temperature in the 225° F.–275° F. range in reactor (40).

Figure 8:
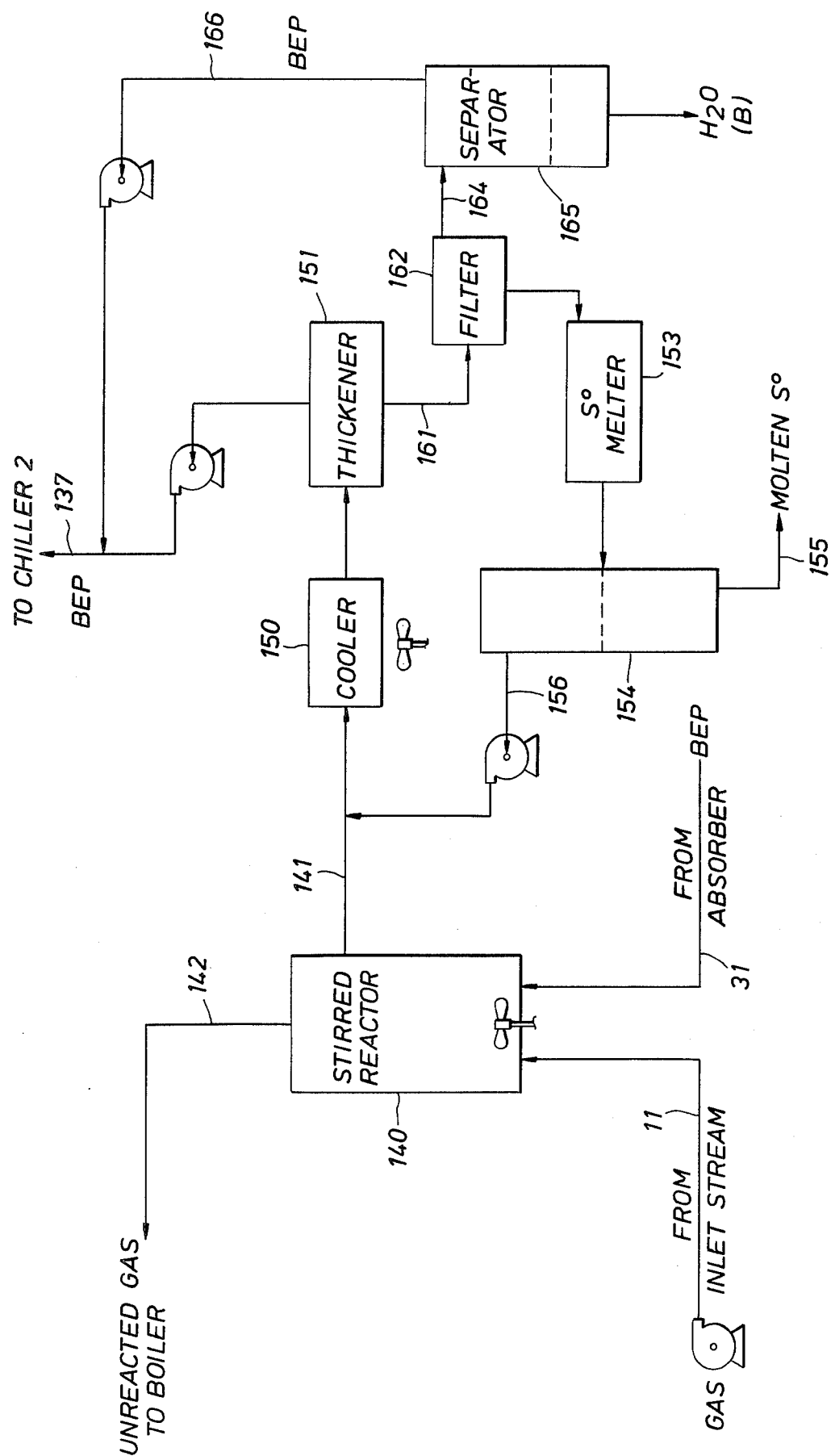
FIG. 8 is a schematic representation of the ambient temperature embodiment of the process showing the H₂S-SO₂ reaction step in a stirred vessel, filtration of thickened sulfur product and separation of the absorbent, product water and sulfur from each other.

Referring now to FIG. 8, an embodiment of the invention is shown setting forth a reacting step in which $H_2S$ and $SO_2$-laden BEP are contacted and reacted at ambient temperatures. For the purpose of describing this embodiment, the term "ambient" means in the range of about 35° F. to about 150° F. The heat of the $H_2S$-$SO_2$ reaction causes the flowing reactant streams to increase in temperature during the reaction, but the BEP laden with product sulfur and water exits the reactor at substantially lower temperatures than the elevated temperature embodiment. Assuming the same flow rates and other parameters as the elevated reaction temperature embodiment, the heat of reaction will cause a somewhat greater rise in temperature during the reacting step than in the elevated temperature embodiment.

Since exit temperatures from the reactor are typically in the range of 70° F. to 150° F., substantially all of the product sulfur formed is crystalline and most of the product water formed is liquid. As will be understood by one skilled in the art, treatment of product streams and separation of products will vary from the elevated temperature embodiment. However, the combustion of a portion of the inlet $H_2S$-containing gas stream and absorption of the $SO_2$ thus formed are the same. One change in process equipment made desirable by the ambient temperature reacting step is the construction of the reactor. Since product sulfur crystallizes rapidly after formation when in intimate contact with sulfur crystals, a stirred reactor, rather than a packed column, should be used. The amorphous sulfur first formed and the crystalline sulfur subsequently formed would quickly foul and clog a packed column.

In FIG. 1, the only change required for the ambient temperature embodiment of the invention is the elimination of absorber heat exchangers (32, 33, 34) since the $SO_2$-laden BEP may be taken without heating directly in absorber exit line (31) to a stirred reaction vessel (140) in FIG. 8. Stirred reaction vessel (140) is closed from the atmosphere to contain any gases from inlet stream (11) which remain unreacted after the reacting step.

Those unreacted gases are passed through the off-gas line (142) back to boiler (13) in FIG. 1. Stirred reactor (140) may take several forms, and one construction for such a reactor may be found in U.S. Pat. No. 3,791,104 to Clitheroe.

BEP laden with $SO_2$ from absorber exit line (31) is fed to stirred reactor (140) to be reacted with the approximately ⅜ of gas inlet stream (10) from reactor feed stream (11). The reactants preferably enter stirred reactor (140) in the range of from about 35° F. to about 70° F., but any entering temperature which, with heat of reaction in the reactor, yields crystalline sulfur and liquid product water in the reactor exit stream (141) is acceptable.

Reactor exit stream (141) is passed through a cooler (150) and then to a thickener (151). Any clarified BEP removed from an upper portion of thickener (151) is pumped through the line (137) and returned to absorber chiller (36) of FIG. 1. The crystalline sulfur with BEP adhered thereto is taken through filter line (161) and separated in a filter (162) or centrifuge (not shown) to further separate the sulfur from BEP and water. Thereafter, sulfur with BEP adhered thereto, the filtrate from filter (162), is transferred to a sulfur melter (153), melted, and then the molten sulfur separated from BEP, and flowed by the sulfur line (155) to sulfur storage (not shown).

The BEP and water from filter (162) is then taken by the filter line (164) to a BEP-water separator (165) to allow the BEP and water to separate into two phases. The water stream (B) is taken from a lower portion of BEP-water separator (165) and is then taken to water stripping tower (61) of FIG. 3 to be treated as discussed above. The separated BEP is pumped through line (166) to be added to the BEP stream in line (137).

As discussed for the elevated temperature embodiment shown in FIG. 2, the BEP in separator (165), line (166), line (137), the sulfur separator (154) and line (156) of FIG. 8, still contains some dissolved sulfur, but the water exiting BEP-water separator (165) as water stream (B) and the molten sulfur exiting sulfur separator (154) are substantially completely free of BEP.

EXAMPLES

Example No. 1—BEP into which 28.4 grams per liter of $SO_2$ had been absorbed previously was charged at a rate of 119.8 cubic centimeters per minute to the bottom of a packed column. The column was 44 inches in height and 2 inches in internal diameter. The packing was 31 inches of 9 m.m. beryl saddles, leaving void spaces of 5.25 inches at the column top and 8.25 inches at the column bottom. Also charged to the bottom of the column were 2,061 cubic centimeters per minute of $H_2S$ and 552.5 cubic centimeters per minute of carbon dioxide (measured at 760 millimeters Hg. and 0° centigrade). Thus, there was approximately 15.6% of excess $SO_2$ over the stoichiometric amount of $H_2S$ to be reacted in this example. The temperature at the bottom of the column was 214° F. and temperature at the top of the column was 259° F. The pressure at the bottom of the column was 23.5 psia and the pressure at the top of the column was approximately 22.5 psia. The test was continued for one hour. Based on stoichiometric quantities of $H_2S$ and $SO_2$, conversion to sulfur was 90.3%. Unreacted gases and the BEP containing dissolved sulfur were removed from the top of the column, separated and subsequently analyzed.

Example No. 2—Example 2 was run in the same manner and in the same column as example 1, except that the packing length was decreased to 18 inches and the top and bottom void spaces were maintained the same as in example 1. BEP at a rate of 122 cubic centimeters per minute into which 30.1 grams per liter of $SO_2$ had been previously absorbed was charged into the bottom of the column. Also charged to the bottom of the column were 2,142 cc's per minute of $H_2S$ and 597 cc's of $CO_2$ (measured at 760 millimeters Hg. and 0° centigrade). Therefore, approximately 19.9% excess of $SO_2$ over stoichiometric amount of $H_2S$ was contained in the BEP. The temperature at the bottom of the column was 221° F. and the temperature at the top of the column was 256° F. The pressure at the bottom of the column 23.4 psia and the pressure at the top of the column was approximately 23.1 psia. The test was carried out for 52 minutes and separation and analysis were carried out in the same manner as example 1. Conversion of $H_2S$ and $SO_2$ to sulfur, based on stoichiometric quantities of $H_2S$ and $SO_2$, was 87.6%.

Example No. 3—BEP into which 35.2 grams per liter of $SO_2$ had been absorbed previously was pumped at a rate of 105 cc's per minute into a stirred pressure vessel. The stirred reactor was a modified version of that reactor described in U.S. Pat. No. 3,791,104 to Clitheroe. The pressure vessel was constructed from a 6 inch diameter by 8 inch tall glass pipe nipple. The impeller consisted of 2 aeration type impellers fit bottom to bottom on a magnetically driven shaft with variable speed. The total height of the two aeration type impellers was ⅞" and the diameter was 2½ inches. 18 radial vanes equally spaced about the impeller made up the baffle. The baffle vanes were 1⅛ inches tall, 1 inch in length and the inside diameter was 2⅞ inches. Thus there was a space of ⅜ inch between the outer edge of the impeller and the inner edges of the baffle vanes. The bottom edge of the baffle vane was located 1⅜ inches above the bottom of the pressure vessel. The operating liquid level was approximately 4⅜ inches or about 2000 cc of volume. Also charged to the stirred reactor was $H_2S$ and $CO_2$. The $H_2S$ rate was 2.8578 grams of $H_2S$ per minute. The $CO_2$ rate was 18.7 volume percent of the $H_2S$. Thus there was approximately 24.7 percent of excess $SO_2$ over the stoichiometric amount of $H_2S$ to be reacted in this example. The inlet temperatures to the stirred reactor were maintained at 101.5° F. and the outlet temperatures of unreacted gas and slurry temperatures were approximately 154° F. The pressure into the reactor was 4.5 psig (17.14 psia) and the pressure out was 3.0 psig (15.64 psia). Based on stoichiometric quantities of $H_2S$ and $SO_2$, conversion to sulfur was 99.2%.

This test was repeated six times using the same BEP to determine if any degradation of the BEP occurred. None was noted. The impeller tip speed was varied from 953 to 1191 feet per minute with no apparent effect on the reaction. Each of the six tests was carried out for approximately 68 minutes. The sulfur produced was bright, clean, coarsely crystalline, and settled and filtered well.

It has been discovered that the phosphonate absorbents used in the present invention do not react with $SO_2$ or $H_2S$ and absorption and desorption of $SO_2$, as well as the $SO_2$ reaction with $H_2S$, do not affect the physical and chemical characteristics of the absorbents despite teachings in the prior art literature to the contrary. The phosphonate absorbents have been found to have good chemical and thermal stability in the absorption, desorption and reaction phases of the present process. For the elevated temperature embodiment, the solubility of sulfur in hot BEP was found to aid the reaction completeness by effectively removing product sulfur from the reaction site and thus driving the reaction to the right. For the ambient temperature embodiment, crystallization of elemental sulfur in the stirred reactor achieved the same high degree of reaction completeness.

$SO_2$ will react with mono and diethanolamine and $NH_3$ (although BEP itself will not), and if such compounds are present in the gas stream to the reactor, it is desirable in the elevated temperature embodiment to have a filter in the BEP stream exiting the reactor, such as product line (41) to remove the products of those reactions. Care should be taken in both embodiments, and especially in the ambient temperature embodiment, to minimize mono- and diethanalamine and $NH_3$ in the gas stream to the reactor.

Although BEP is reported to be "immiscible" with water, it has been determined that there is actually an approximately 1% solubility of water in BEP. However, there is a near zero solubility of BEP in water.

Thus it can be seen that an effective process for producing sulfur from various $H_2S$ bearing gas streams has been shown. Further modification and alternative embodiments of the steps of this invention will be apparent to those skilled in the art of view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment, and steps may be arranged in other sequences, temperature altered, and others of the family of phosphonate absorbents described herein substituted in the process without departing from the invention.

What is claimed is:

1. A process for treating gases containing $H_2S$ comprising the steps of:
    combusting the $H_2S$ of approximately one-third of an inlet stream containing $H_2S$ to $SO_2$;
    contacting the $SO_2$ from said combusting step with an absorbent consisting essentially of a phosphonate absorbent, whereby said $SO_2$ is selectively absorbed;
    reacting the $H_2S$ from the remainder of said inlet stream with said absorbed $SO_2$ in the presence of said phosphonate absorbent, thereby forming elemental sulfur and water; and,
    separating the sulfur and water thus formed from said phosphonate absorbent.

2. The process as claimed in claim 1, including the additional step of:
    cooling the $SO_2$—bearing gases from said combusting step prior to said contacting step.

3. The process as claimed in claim 1, including the additional step of:
    recycling the unreacted gases from said reacting step back through said combusting step.

4. The process as claimed in claim 1, including the additional steps of:
    cooling said absorbent after said reacting step; and,
    recycling said absorbent back to said contacting step.

5. The process as claimed in claim 1, wherein:
    said contacting step is carried out in the range of about 35° F. to about 120° F. at a pressure at least about 0 p.s.i.g.

6. The process as claimed in claim 1, wherein:
    said reacting step is carried out in the range of about 35° F. to about 275° F. and at a pressure from about 3 p.s.i.g. to about 25 p.s.i.g.

7. The process as claimed in claim 1, wherein said separating step includes the steps of:
    increasing the concentration of solid sulfur in said absorbent;
    elevating the temperature of said solid sulfur and absorbent to the melting point of sulfur to form two immiscible liquid phases; and,
    separating said phases.

8. The process as claimed in claim 1, including the additional step of:
    heating said absorbent containing said absorbed $SO_2$ from said contacting step prior to said reacting step.

9. The process as claimed in claim 7 wherein said separating step includes the step of:
    removing said water formed in said reacting step from said phosphonate absorbent after said increasing step and prior to said temperature elevating step.

* * * * *

UNITED STATES PATENT AND TRADEMARK OFFICE
CERTIFICATE OF CORRECTION

PATENT NO. : 4,479,929
DATED : October 30, 1984
INVENTOR(S) : F. Hilton Lacy, Jr.

It is certified that error appears in the above—identified patent and that said Letters Patent are hereby corrected as shown below:

In column 5, line 2, delete "36", and insert -- 26 -- therefor.

Signed and Sealed this

Twenty-third Day of April 1985

[SEAL]

Attest:

DONALD J. QUIGG

Attesting Officer     Acting Commissioner of Patents and Trademarks